United States Patent
Packer et al.

(10) Patent No.: US 6,896,834 B2
(45) Date of Patent: May 24, 2005

(54) METHOD OF APPLYING ABLATIVE INSULATION COATINGS

(75) Inventors: Bradford P. Packer, Logan, UT (US); Roy E. Bronson, Ogden, UT (US); Russell Montgomery, Clearfield, UT (US); Roger D. Holstein, Ogden, UT (US)

(73) Assignee: Alliant Techsystems, Inc., Edina, MN (US)

( * ) Notice: Subject to any disclaimer, the term of this patent is extended or adjusted under 35 U.S.C. 154(b) by 442 days.

(21) Appl. No.: 09/950,094

(22) Filed: Sep. 10, 2001

(65) Prior Publication Data

US 2003/0049413 A1 Mar. 13, 2003

(51) Int. Cl.⁷ .............................................. B29C 45/14
(52) U.S. Cl. ..................... 264/255; 264/308; 264/328.8
(58) Field of Search ............................... 264/251, 255, 264/259, 261, 308, 328.8, 129, 275, 161, 219, 327

(56) References Cited

U.S. PATENT DOCUMENTS

| | | | |
|---|---|---|---|
| 3,177,175 A | | 4/1965 | Barry |
| 3,380,941 A | * | 4/1968 | Dittman et al. .............. 523/179 |
| 3,755,223 A | * | 8/1973 | Engel .......................... 523/179 |
| 3,875,106 A | * | 4/1975 | Lazzaro ....................... 523/179 |
| 4,031,605 A | * | 6/1977 | Couch et al. .................. 29/460 |
| 4,041,872 A | * | 8/1977 | McCown et al. ......... 250/515.1 |
| 4,204,899 A | | 5/1980 | Walker et al. |
| 4,546,674 A | * | 10/1985 | Clark et al. ................. 76/107.1 |
| 4,595,714 A | * | 6/1986 | McAllister et al. ......... 523/179 |
| 4,772,495 A | | 9/1988 | Headrick et al. |
| 5,064,583 A | * | 11/1991 | Dagostino et al. ............. 264/39 |
| 5,094,887 A | | 3/1992 | Bagdasarian |
| 5,212,944 A | * | 5/1993 | Martin et al. .................. 60/253 |
| 5,307,992 A | | 5/1994 | Hall et al. |
| 5,352,312 A | | 10/1994 | Guillot |
| 5,399,599 A | | 3/1995 | Guillot |
| 5,579,998 A | | 12/1996 | Hall et al. |
| 5,703,178 A | * | 12/1997 | Gasmena ..................... 525/476 |
| 5,746,961 A | * | 5/1998 | Stevenson et al. .......... 264/255 |
| 5,882,765 A | | 3/1999 | Pastureau et al. |
| 5,985,405 A | | 11/1999 | Doucette, Jr. et al. |
| 6,627,697 B2 | * | 9/2003 | Barney et al. ............... 524/588 |

OTHER PUBLICATIONS

SAE Standard AS5127/1, revision A, paragraph 8.2.*
Barry, W.T., et al., "A Study of Physical and Chemical Processes Accompanying the Ablation of Castable Charring Epoxy Resins," Chem. Eng. Reviews, No. 48, vol. 60, pp. 99–112.

* cited by examiner

Primary Examiner—Michael P. Colaianni
Assistant Examiner—Monica A. Fontaine
(74) Attorney, Agent, or Firm—TraskBritt

(57) ABSTRACT

A method of forming ablative insulation coatings on aerospace structures and articles produced thereby. The method includes forming a mold having a cavity configured to complementarily receive at least a portion of the structure and directly molding the ablative coating to a surface of the structure by introducing a prepared ablative mixture, such as an epoxy resin, into the mold. The process may desirably include curing at atmospheric pressures to reduce the expense and equipment required in carrying out the process. The method of applying the ablative coating further includes features such as varying the thickness of the ablative coating from one portion of the component to another. Control of the thickness may be effected through use of spacers embedded into the ablative coating and formed of the same or similar material previously cured prior to placement in the mold.

28 Claims, 8 Drawing Sheets

METHOD OF APPLYING ABLATIVE INSULATION COATINGS

BACKGROUND OF THE INVENTION

1. Field of the Invention

The present invention relates generally to coatings of insulative and ablative materials. More particularly, the present invention relates to ablative coatings on exposed components of aerospace structures and a method of forming such coatings.

2. State of the Art

Ablative coatings are thermally insulating coatings typically utilized as heat shields for exposed surfaces of aerospace equipment such as rockets, missiles, space shuttles and similar vehicles. The ablative coating serves to protect the structure from high thermal energy experienced due to high velocity conditions, for example during launch or re-entry into the earth's atmosphere. The ablation of such a coating is a known phenomenon by which energy incident upon an ablating material is dissipated through vaporization of the material rather than conversion of the energy into heat. Thus, during exposure to the heat energy, the material of the ablative coating is eroded away through vaporization, dissipating the incident heat energy by converting the solid material into vaporous matter.

Formation of ablative coatings of aerospace structures is conventionally accomplished through one or more processes known in the art. In one process, the ablative coating is formed by molding the ablative material into a sheet and subsequently applying the sheet to a surface of the aerospace structure with an adhesive. Such a process is very labor intensive and time consuming. Molded sheets of ablative material, while exhibiting a certain amount of flexibility, are difficult to shape and conform to the complex shapes found in aerospace structures. Thus, a considerable amount of time is spent cutting, shaping and otherwise manipulating the sheet material in order to cover a desired surface. Additionally, much of the ablative material may be wasted in trimming and shaping the sheet material.

In some applications, adhering the sheet material to the surface requires the structure to be placed in a vacuum bag or a similar process in order to accomplish proper adherence of the sheet material to the surface of the structure. This practice helps to minimize and hopefully eliminate voids between the sheet of ablative material and the surface of the aerospace structure. Additionally, once a surface is covered with the sheet material, substantial work is required to achieve a desired surface finish, which may entail machining, grinding or sanding. Such post-application surface work is also required with regard to joints formed at adjacent edges of abutting sheets of ablative material.

Hand troweling is another conventional technique which has been utilized to apply ablative material to the surface of an aerospace structure. Hand troweling includes applying the ablative material to the surface of the aerospace structure by a hand trowel and allowing the ablative material to cure in place. This technique allows for the ablative material to be placed directly on the structure and also provides a means of coating complex shapes. However, hand troweling requires a high degree of skill and is very time consuming and labor intensive. Additionally, substantial rework is still required to produce the desired surface finish and shape. Also, it is difficult to monitor and control the thickness of the applied coating, particularly if the coating is placed over complex surfaces and the thickness is to be varied from one area of the aerospace structure to another.

Yet another conventional technique of applying ablative coatings is to spray the coating directly onto the structure. Similar to the technique of hand troweling, spraying the ablative coating allows the material to cure in place. Also, spraying lends itself to coating aerospace structures having complex geometries. However, spraying typically requires the use of an ablative composition having a relatively low viscosity in order to pass the ablative material through the spraying equipment. Due to the nature of spraying, including the lower viscosity material, only a nominal thickness of the material may be applied to the aerospace component at one time. In order to achieve a sprayed-on coating with any substantial thickness, multiple coatings must be applied. This becomes an extremely time-consuming process, wherein a coating is applied and then cured to a specified level prior to application of a subsequent coating.

Additionally, spraying does not provide adequate thickness control. Spraying is particularly deficient in applying ablative coatings which require a varied thickness over the surface of the aerospace component. Thickness control, in part, becomes a process of reworking the coating by hand after it is cured. Indeed, in some cases, surface work may be required between spray coatings, adding to the time and labor required to achieve a satisfactory coating.

The technique of spraying also results in incidental overspray. Overspray results in material waste and also requires the use and maintenance of special facilities, such as a spray booth, again increasing the cost of applying the ablative coating. Furthermore, ablative coatings often include a fibrous or particulate material in the ablative composition which poses additional problems for spraying. Fibers and particulates can clog the spraying equipment, requiring excessive cleaning and undue maintenance.

As an example of the time and labor involved with spraying an ablative coating onto structures having complex shapes, FIGS. 1A–1C show an aerospace component at various stages during spray application of an ablative coating. Referring to FIG. 1A, a ring strap 10 utilized in conjunction with an aeroskirt structure of a rocket is shown prior to application of an ablative coating. The ring strap 10 includes a number of nut plates 12 which protrude from an arcuately shaped plate 14. Such a configuration makes it difficult to provide an ablative coating of consistent thickness. FIG. 1B shows the ring strap 10 with an ablative coating 16 applied by multiple sprayed coatings of ablative material. The ablative coating 16 is not conformal to the original geometry of the ring strap 10 and generally results in peaks 18 and valleys 20 formed in the surface of the ablative coating 16. However, design requirements often specify a more conformal coating with a surface finish which is improved over that of a sprayed coating. Thus, as seen in FIG. 1C, substantial post-application rework is required to produce a substantially conformal coating 16'. Such rework may involve trimming, grinding, machining, sanding and the like. A substantial amount of time is involved in, first, building up the ablative coating 16 (FIG. 1B), and, second, reworking the ablative material to produce a conformal coating 16' (FIG. 1C) with a satisfactory surface finish. Additionally, it is evident that a great deal of material is wasted in coating a part such as the ring strap 10 in such a manner.

Furthermore, with each of the conventional techniques discussed above, variations exist in the resultant coatings from one component to another like component. For example, tight tolerances are difficult to maintain consistently regarding thickness, surface finish, density and other material characteristics. The ability to consistently apply coatings with repeatable and predictable results has been somewhat elusive with such techniques. Unacceptable variations are due, in part, to the manner in which the material is applied and, in part, to the fact that operators of different skill levels may be applying the coating.

In view of the shortcomings in the art, it would be advantageous to provide a method of applying ablative insulating coatings to structures in a reduced amount of time and with less wasted material. Additionally, it would be advantageous to provide a method which provides repeatable and predictable results.

In providing repeatable results, the method would desirably minimize the opportunity for variance by reducing the number of variables affected by operators forming the ablative coating. Additionally, it would be desirable to provide a more standardized process such that variance would not be realized in the application of the material by one operator when compared to application by another operator.

Such a method would also desirably result in improved surface finish and thickness control, thus minimizing the amount of touch-up work required.

BRIEF SUMMARY OF THE INVENTION

In accordance with one aspect of the invention, a method of forming an ablative coating on a structure is provided. The method includes forming a mold with a cavity configured to cooperatively receive the structure or portion thereof which is to be coated. The structure or portion thereof is then placed in the mold cavity and a mixture of ablative material is introduced into the mold cavity, such as by pouring or by injection. The ablative material is then cured and substantially simultaneously adhered to a surface of the structure.

Curing of the ablative material may be conducted under pressure but, more desirably, occurs at atmospheric conditions to reduce the need for expensive equipment which might otherwise be required to carry out the process. The curing stage may also be effected in multiple stages, such as a first stage at a first temperature followed by a second curing stage at a second, elevated temperature.

In accordance with another aspect of the present invention, another method is provided for forming an ablative coating on a structure. The method includes forming a mold with a cavity so as to cooperatively receive the structure or portion thereof which is to be coated. The structure or portion is then placed in the mold cavity. A mixture of ablative insulation material is prepared by combining and mixing a salt-filled epoxy resin base with a fiber-filled polyamide hardener and a silicone resin modifier. The ablative mixture is introduced into the mold cavity. The ablative insulation material is then cured and substantially simultaneously adhered to a surface of the structure.

The ablative insulation material may be mixed under pressure so as to keep the material from becoming entrained with air. The pressure assists in collapsing any air bubbles formed during mixing.

The material may also be heated prior to introduction into the mold to reduce viscosity and improve flowability of the material.

Additional acts may also be incorporated into the method, as set forth herein, to enhance or alter the process in a desired manner.

In accordance with another aspect of the invention, an aeroskirt component is provided. The aeroskirt comprises a first structure, such as a snap ring, a door cover, a stiffening ring, or any other structure associated with an aeroskirt, and an ablative insulation coating which is molded directly to a surface of the structure.

The aeroskirt component may further include at least one preformed spacer embedded in the ablative insulation coating. More desirably, the aeroskirt component may include at least two spacers embedded in the ablative coating with one spacer representing a first thickness and the second spacer representing a second thickness such that the ablative coating has a varied thickness over the surface of the component. The spacers may be advantageously formed of the same or similar material as the ablative coating.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1A:
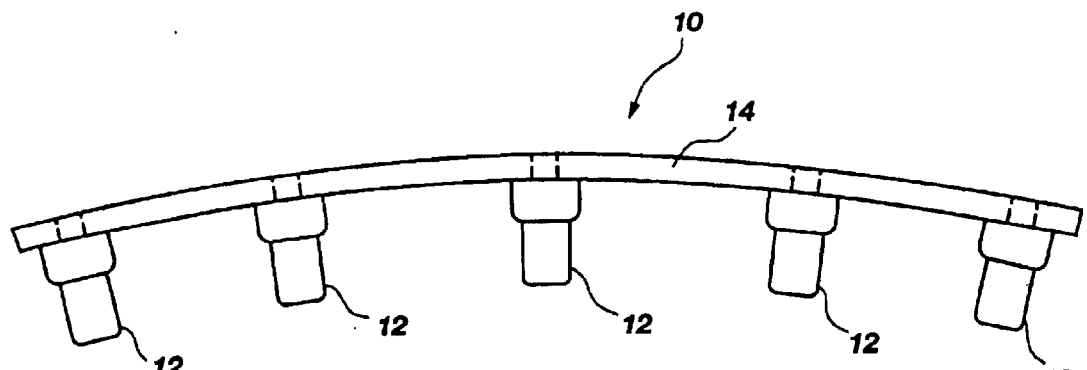
FIGS. 1A–1C show an aerospace component with an ablative coating applied by a conventional spraying process.
Figure 1B:
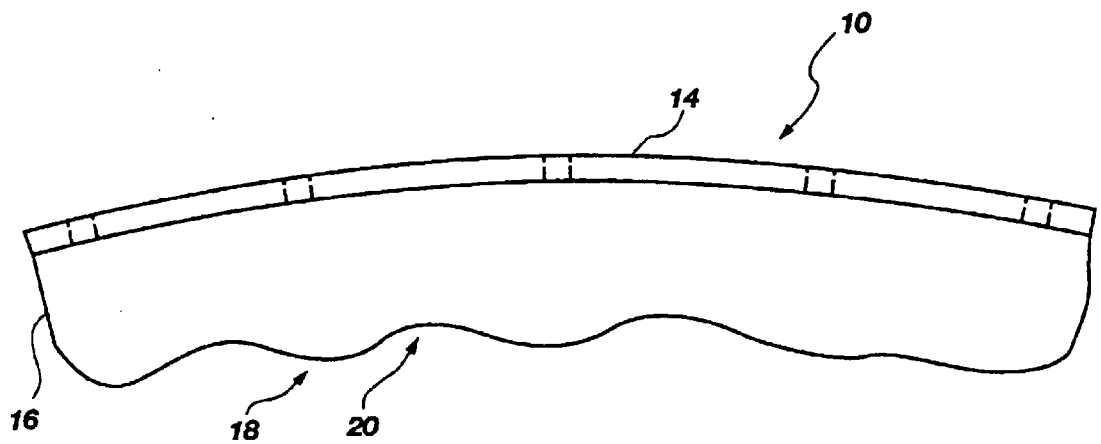
Figure 1C:
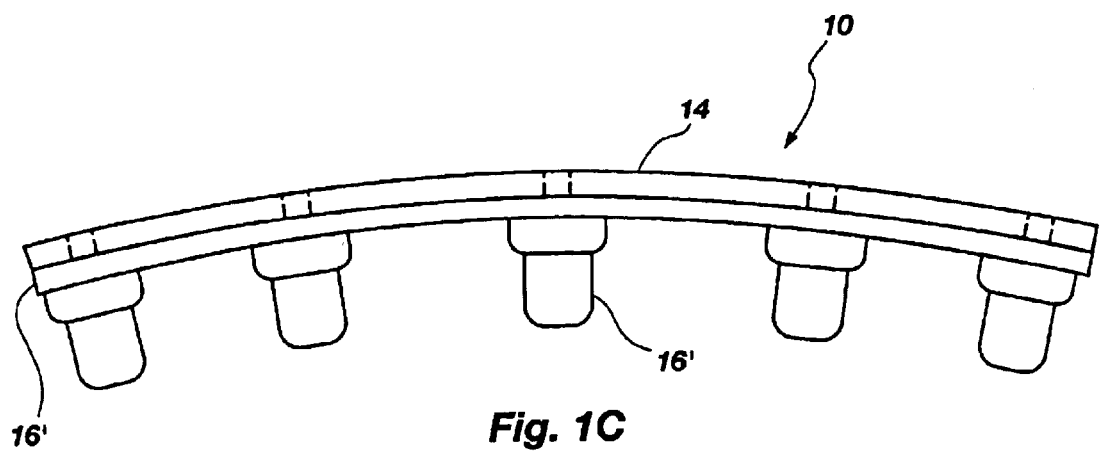
Figure 2:
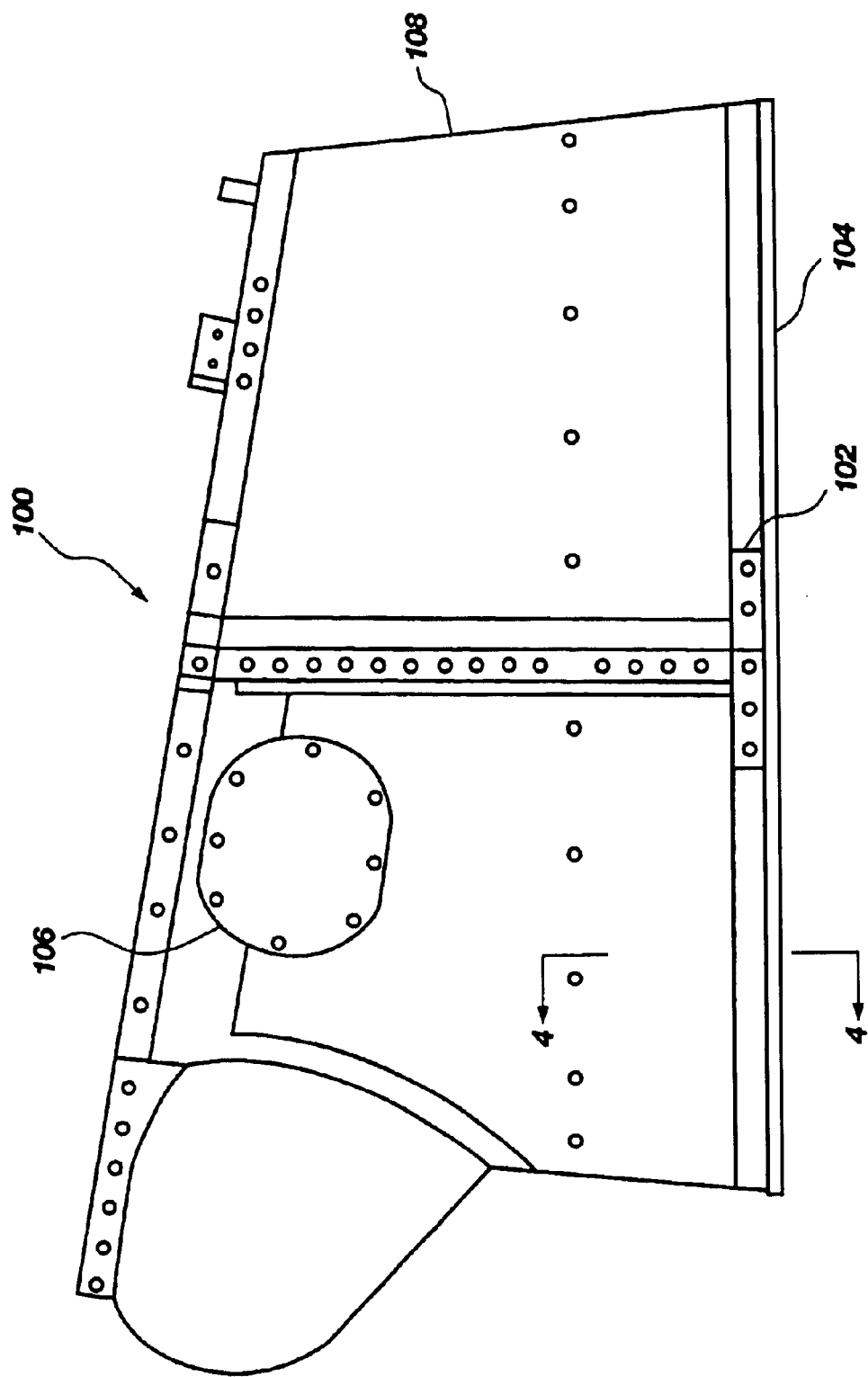
FIG. 2 shows an aerospace structure requiring an ablative coating.

Referring now to FIG. 2, an aeroskirt 100 for assembly about a rocket casing is shown. As can be seen, the aeroskirt 100 has numerous components and a complex geometry, making application of an ablative coating difficult. For example, a snap ring 102 is located at the aft end 104 of the aeroskirt 100 which is to be individually coated. Similarly, an access door cover 106 is to be coated as an individual component. Additionally, the shell 108 of the aeroskirt 100 is to receive an ablative coating which varies in thickness across its surface. Each of these components poses different challenges in applying the ablative coating as shall be seen and discussed below.

Various compositions are available for use as ablative coatings and the present invention may be practiced with such various available compositions. However, the present invention will be described in an exemplary manner with regard to the application of an ablative coating known as Sparesyl, which is a proprietary coating prepared by Dexter-Hysol of Bay Point, Calif., for Boeing Corporation. Sparesyl is an epoxy ablative insulation system formed as a mixture of three different components. The first component is a salt-filled epoxy resin which serves as a base. The second component is a fiber-filled polyamide hardener. The third component is a silicone modifier. The mixture is combined in proportions of 100 parts (by weight) epoxy resin to 86 parts polyamide hardener and 35 parts silicone modifier.

Sparesyl may be mixed either by combining the proper proportions in a commercial mixer or by combining the components and mixing them by hand. Proper mixing is important since an improperly mixed composition may result in the coated parts being stripped and having to be recoated.

One particularly effective means of mixing the ablative composition is to use a commercial mixer such as a Hydra-Cat, which is available from Graco, Inc., of Minneapolis, Minn. The Hydra-Cat acts as a proportioner assisting in the measurement and mixing of the three different components according to their proper ratios. Additionally, it mixes the composition under pressure and collapses air bubbles which may otherwise be formed during mixing. As shall be discussed in more detail below, it is important to produce a cured coating which is substantially free of air bubbles. Keeping the air from the final coating may be accomplished in different ways. However, by preparing the mixture in a machine such as the Hydra-Cat air bubbles are effectively removed prior to application of the composition to the aeroskirt 100 or other component. In addition to mixing the composition and removing air bubbles therefrom, the Hydra-Cat may be used to pump the material to its point of application.

It is noted that other commercial mixers may be effective in mixing the ablative composition. However, use of other mixers may require the use of a separate pump and pressurizer in order to degas the mixture and to pump the mixture to its point of application.

As stated above, an alternative method of preparing the Sparesyl composition is to mix it by hand. Hand mixing does provide the advantage of more precise measuring of the three individual components. However, hand mixing also tends to introduce more air into the resultant mixture. To reduce the amount of air incorporated into the mixture, the material may be allowed to stand for 40 to 60 minutes prior to application in order to allow the entrained air and volatile components to escape.

Regardless of whether the composition is prepared through hand mixing or use of a commercial mixer, the epoxy resin is thoroughly mixed for a minimum of 20 to 30 minutes prior to combination with the hardener and modifier to ensure adequate suspension of solids which may have settled to the bottom of its container during storage. Similarly, the polyamide hardener should be thoroughly mixed for at least 20 to 30 minutes prior to adding it to the other two components to ensure proper suspension of solids.

Figure 3A:
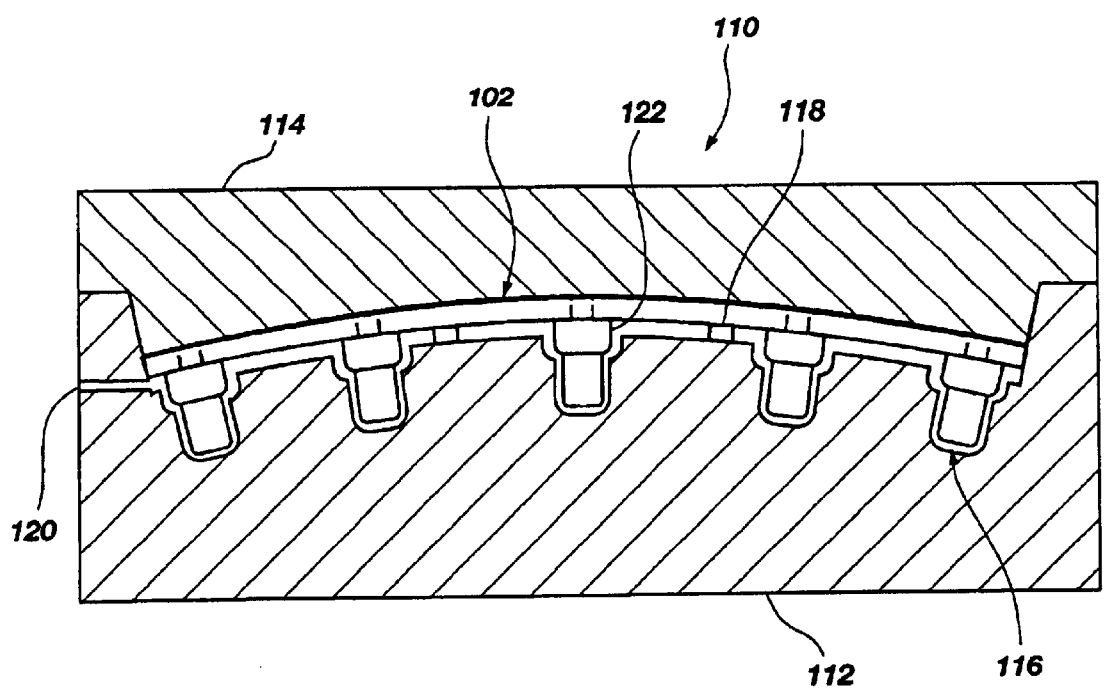
FIG. 3A shows a mold for application of an ablative coating according to one aspect of the invention.
Figure 3B:
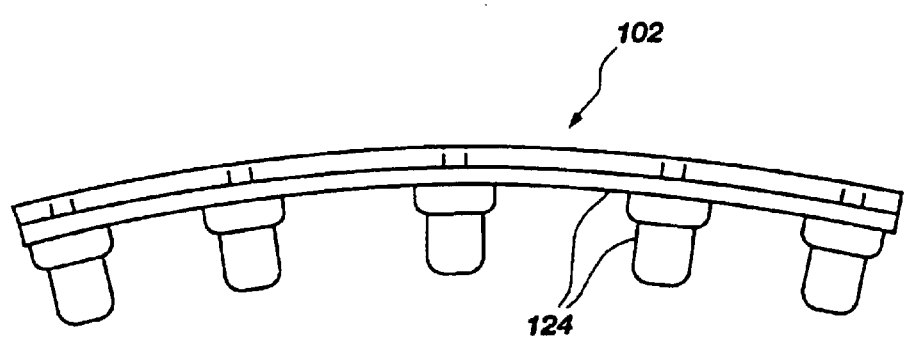
FIG. 3B shows a component having an ablative coating applied using with the mold of FIG. 3A.

Referring to FIG. 3A, the cross section of a mold 110 is shown with a snap ring 102 disposed therein for application of the ablative material to particular areas of the snap ring 102. A base portion 112 of the mold 110 is shaped and configured to complementarily receive the snap ring 102 therein. A cover 114 is placed on top of the snap ring 102 to hold it into place during application of the ablative material. A space or cavity 116 is formed about the particular surface or surfaces of the snap ring 102 which are to be coated with ablative material. This space or cavity 116 may be formed through design of the mold 110, or may be formed by use of spacers 118 which serve to suspend the snap ring 102 above the base portion 112 of the mold 110 and act as a thickness indicator or gauge for the resulting ablative coating. The spacers 118 may be formed as previously cured ablative material, such as from Sparesyl, and preferably from the same type of ablative material which is to be introduced into the mold 110 to coat the snap ring 102.

The mixed ablative material may be introduced into the mold 110 through ports 120 and flowed into the space or cavity 116 formed between the base portion 112 of the mold 110 and the snap ring 102. While the ports 120 are shown to be located on the sides of the mold 110, it should be noted that other mold designs may also be used. For example, a port could be provided for each bolt cover 122 from the bottom of, or alternatively from the face of, the base portion 112. Alternatively, the mold 110 could be designed as an open mold having a partially open face which would allow the ablative material to be poured or injected into the mold.

Prior to placing the snap ring 102 in the mold 110, the mold is conditioned and prepared. One method of preparing the mold includes cleaning the interior surface of the mold 110 with isopropyl alcohol and then allowing it to dry for a period of time. After the mold 110 is dry, the interior surface is coated with a release agent such as, for example, Dexter Frekote® Release 700, commercially available from Dexter Adhesive & Coating Systems of Seabrook, N.H. After the release coat is applied to the interior surface of the mold 110, it is baked to drive the release coat into the pores of the mold 110 (this process is often referred to as seasoning the mold). As an example, after application of release coat, the mold 110 may be baked at a temperature of approximately 200° F. for approximately 6 hours to season the mold 110. After the mold 110 has been seasoned, a user coat of release agent may be applied and allowed to air dry for an adequate time, such as 30 minutes.

After preparation of the mold 110, the snap ring 102 is placed into the mold 110 and an adequate amount of ablative material is introduced into the mold 110. The ablative material is then cured in place to form an ablative insulation coating 124 adhered to the snap ring 102. The ablative material may be cured under pressure, but is desirably cured at atmospheric pressure to reduce the cost of molds and molding equipment used in applying the ablative insulation coating 124. One method of curing the ablative insulation coating 124 is to cure it at atmospheric pressure at a temperature of from approximately 70° F. to 95° F. for approximately 8 hours. This initial curing period is then followed by a second curing stage at an elevated temperature, such as 110° F., for approximately another 8 hours.

It is noted that if Sparesyl is being used as the ablative material, the ablative material may be heated to slightly reduce the viscosity of the ablative material and increase flowability during its introduction into the mold 110. The ablative material may also be heated during various stages of curing. However, it is desirable that the Sparesyl material not be subjected to a temperature exceeding about 120° F. prior to substantial cure of the material. Excessive heat may keep the material from curing properly and render the resultant coating ineffective as an ablative insulation.

After curing, the mold 110 may be stripped from the snap ring 102 and the ablative coating 124 may be trimmed or buffed if needed to render a specified surface finish. Additionally, if so needed, the ablative insulation coating 124 may be "touched up" by applying a mixture of the ablative material to areas which may exhibit vugs such as blemishes or pock marks in locations where the ablative coating 124 failed to form properly in the mold 110, or perhaps where the material stuck to the surface of the mold 110 during stripping of the snap ring 102. However, it is noted that such touch up work is minimal relative to that which is required with other application processes. It is also noted that the surface finish produced by the presently described process of the invention is typically satisfactory without additional sanding or buffing being required.

The method of applying the ablative insulation coating 124 as disclosed above allows for greater repeatability in producing multiple snap rings 102 (or other components as discussed below) with reduced variability in the resultant surface finish and thickness. Additionally, such a method reduces the subjective input from an operator since the operator doesn't have to determine whether the proper amount of material has been applied or if the proper thickness has been achieved. These variables are consistently controlled by the use of a mold to apply the ablative insulation coating 124.

Figure 4A:
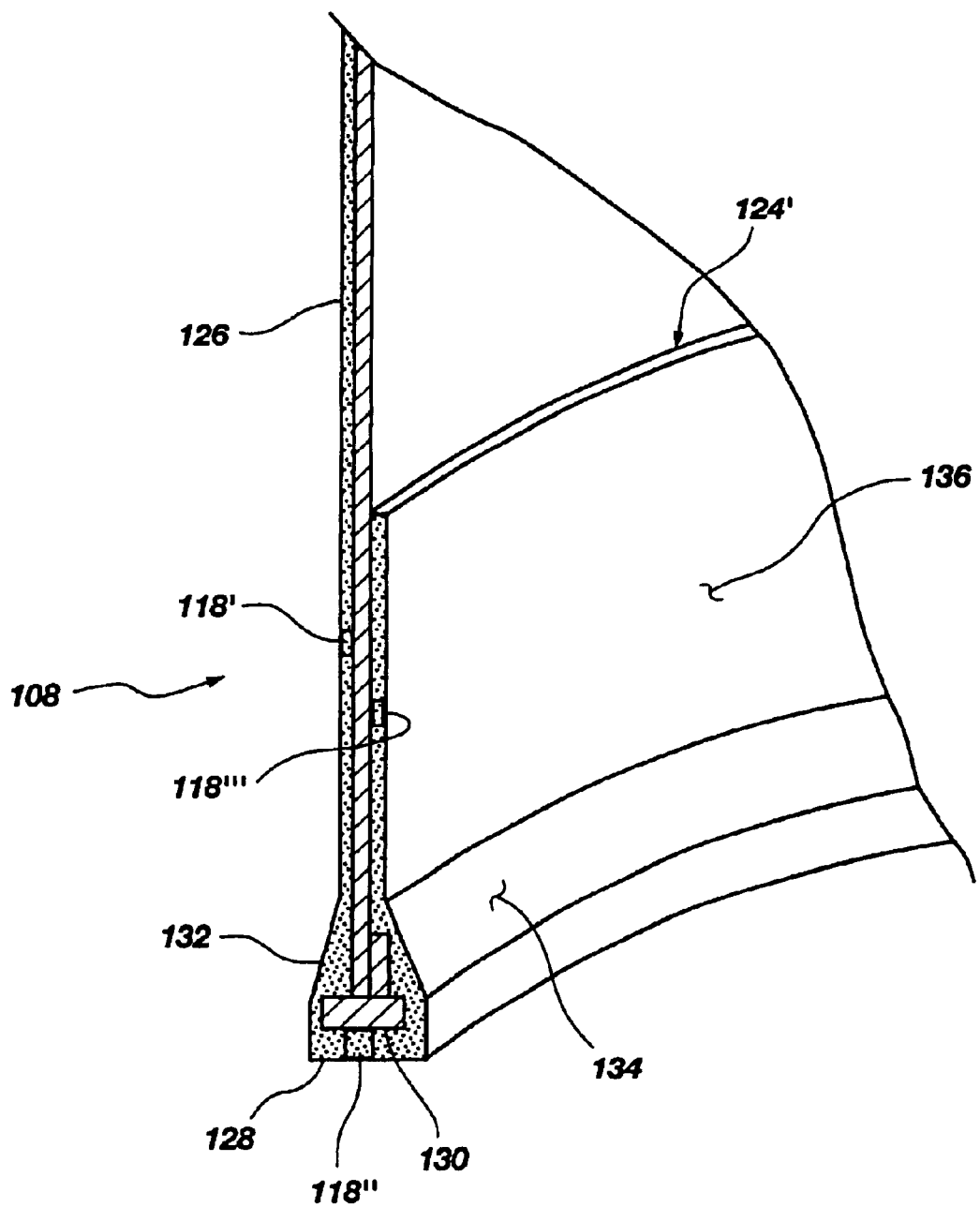
FIGS. 4A and 4B show a partial sectional view of another component having an ablative coating applied according to an aspect of the present invention.
Figure 4B:
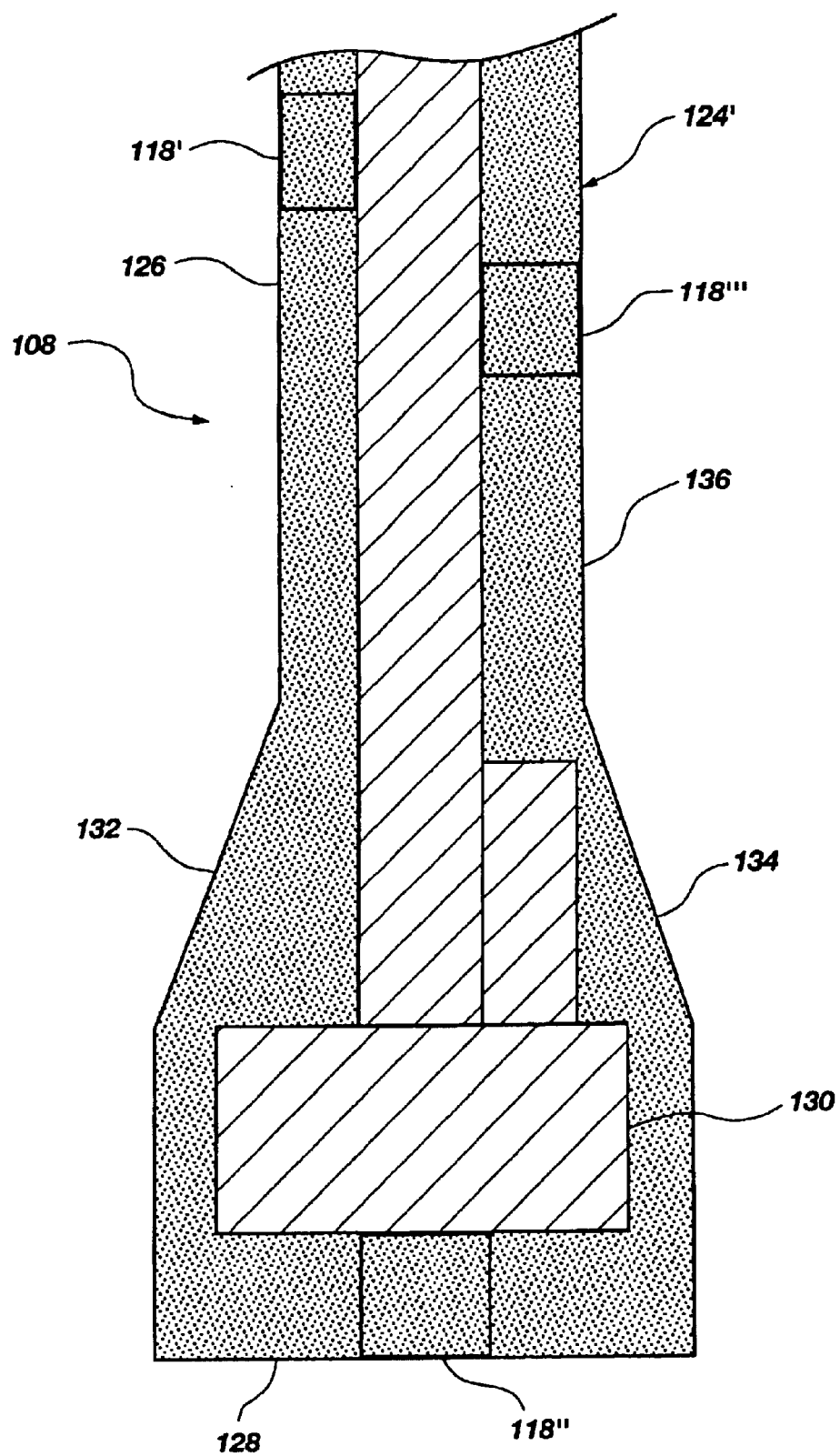

Referring now to FIGS. 4A and 4B, a partial sectional view of the shell 108 of the aeroskirt 100 is shown with an ablative insulation coating 124' applied thereto according to the present invention. It is noted that the ablative insulation coating 124' on the shell 108 is formed in a similar manner as described above with respect to snap ring 102. However, the application of the ablative insulation coating 124' to the shell 108 presents some additional issues which are also addressed by the present inventive method.

The ablative insulation coating 124' formed on the shell 108 varies in thickness from one section to another. For example, the exterior surface 126 of the ablative insulation coating 124' is of a first thickness. The bottom surface 128 below the stiffening ring 130 is of a second thickness. Additionally, a first transition 132 of varying thickness is made from the exterior surface 126 to the bottom surface 128 of the ablative insulation coating 124'. Another transition 134 has a varied thickness from the bottom surface 128 to the interior surface 136 of the ablative insulation coating 124' which may exhibit a thickness different from those associated with the exterior surface 126 and the bottom surface 128. The variation in thickness of the ablative insulation coating 124' is easily controlled in the present application process by properly designing the associated mold (not shown) and by providing spacers 118', 118" and 118'" of varied thickness where required. As noted above, such spacers 118', 118" and 118'" are desirably formed of the same material as the ablative insulation coating 124' and thus do not effect the performance of the resulting structure.

As can be best seen in FIG. 4A, spacer 118' may exhibit a different thickness than either spacer 118" or 118'". Utilizing spacers of differing thicknesses allows for increased versatility in molding the ablative insulation coating 124' where complex shapes and varied thicknesses are required on a single component. Additionally, utilizing spacers 118', 118" and 118'" which are formed of ablative insulation material allows for greater material compatibility and homogeneity. Such compatibility is particularly desirable with respect to material characteristics such as, for example, the coefficient of thermal expansion. By keeping such material characteristics substantially homogeneous throughout the ablative insulation coating 124', the coating will perform its desired function with greater consistency and predictability.

Figure 5A:
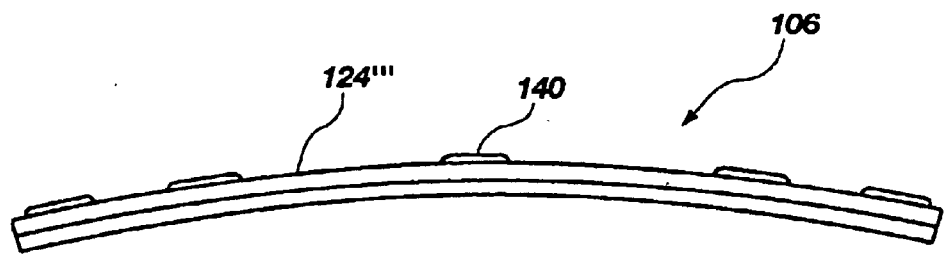
FIGS. 5A and 5B show plan and elevational views, respectively, of a component having an ablative coating applied in accordance with another aspect of the invention.
Figure 5B:
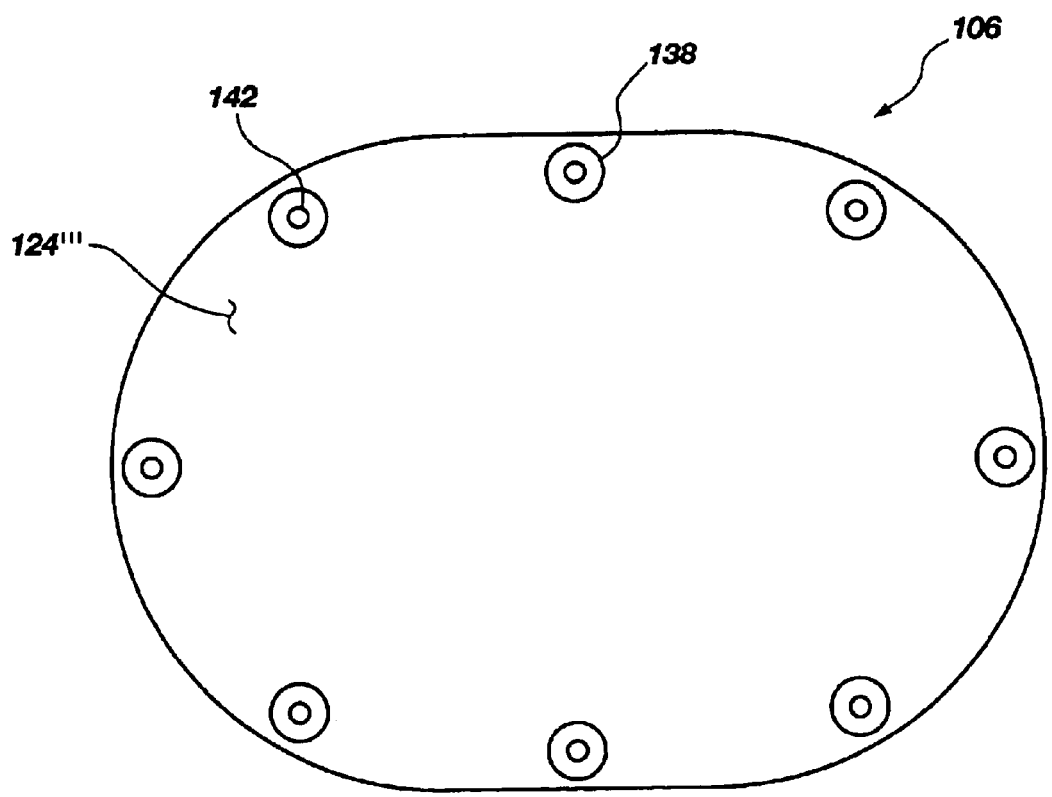

Referring to FIGS. 5A and 5B, a door cover 106 which is used to cover an access port in the aeroskirt 100 is shown. The door cover 106 has been formed in general accordance with techniques described above. However, the door cover 106 has an additional feature incorporated into the applied ablative insulation coating 124'". The door cover 106 is removable from the shell 108 of the aeroskirt 100 to allow access to the rocket to which the aeroskirt 100 is assembled. In order to accommodate the placement of fasteners used to attach the door cover 106 to the aeroskirt 100, stay-out zones 138 (FIG. 5B) are formed in the ablative insulation coating 124'" during the molding process. The stay-out zones devoid of ablative material may be formed by placing inserts 140 (FIG. 5A) at proper locations in the mold prior to introducing the ablative material into the mold. The inserts may be formed as buttons or bosses from a material such as Teflon® which may be easily removed from the cured ablative insulation coating 124'" after stripping the mold from the door cover 106.

As can be seen in FIG. 5B the stay-out zones 138 may be sized and configured to keep the ablative material out of specific areas such as fastener holes 142. The stay-out zones 138 may also be oversized to accommodate and provide clearance for the use of necessary tools, such as a wrench or socket, which may be required for inserting and attaching fasteners therethrough.

Figure 6A:
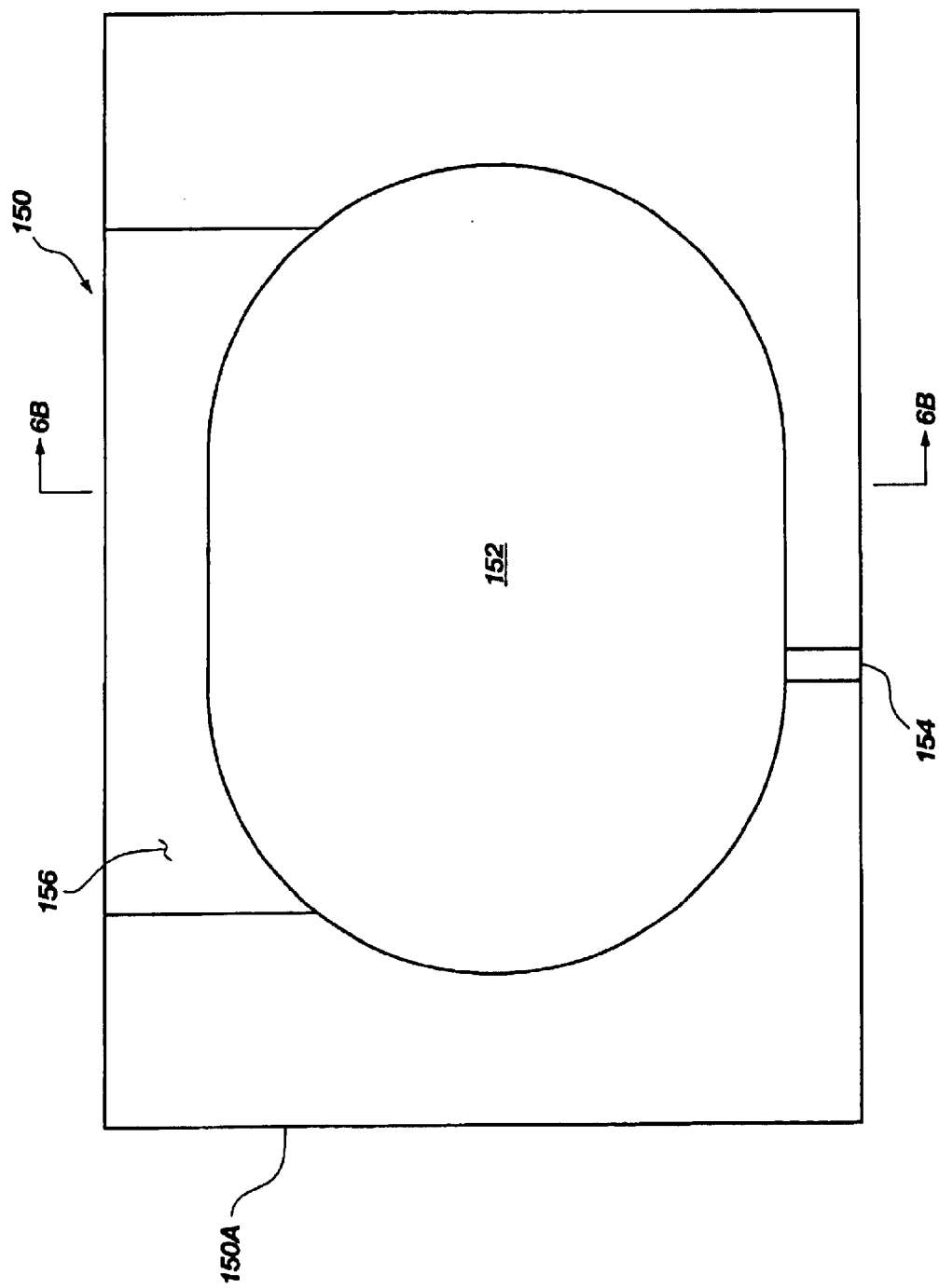
FIGS. 6A and 6B show various views of a mold according to another embodiment used in forming an ablative coating according to the present invention.
Figure 6B:
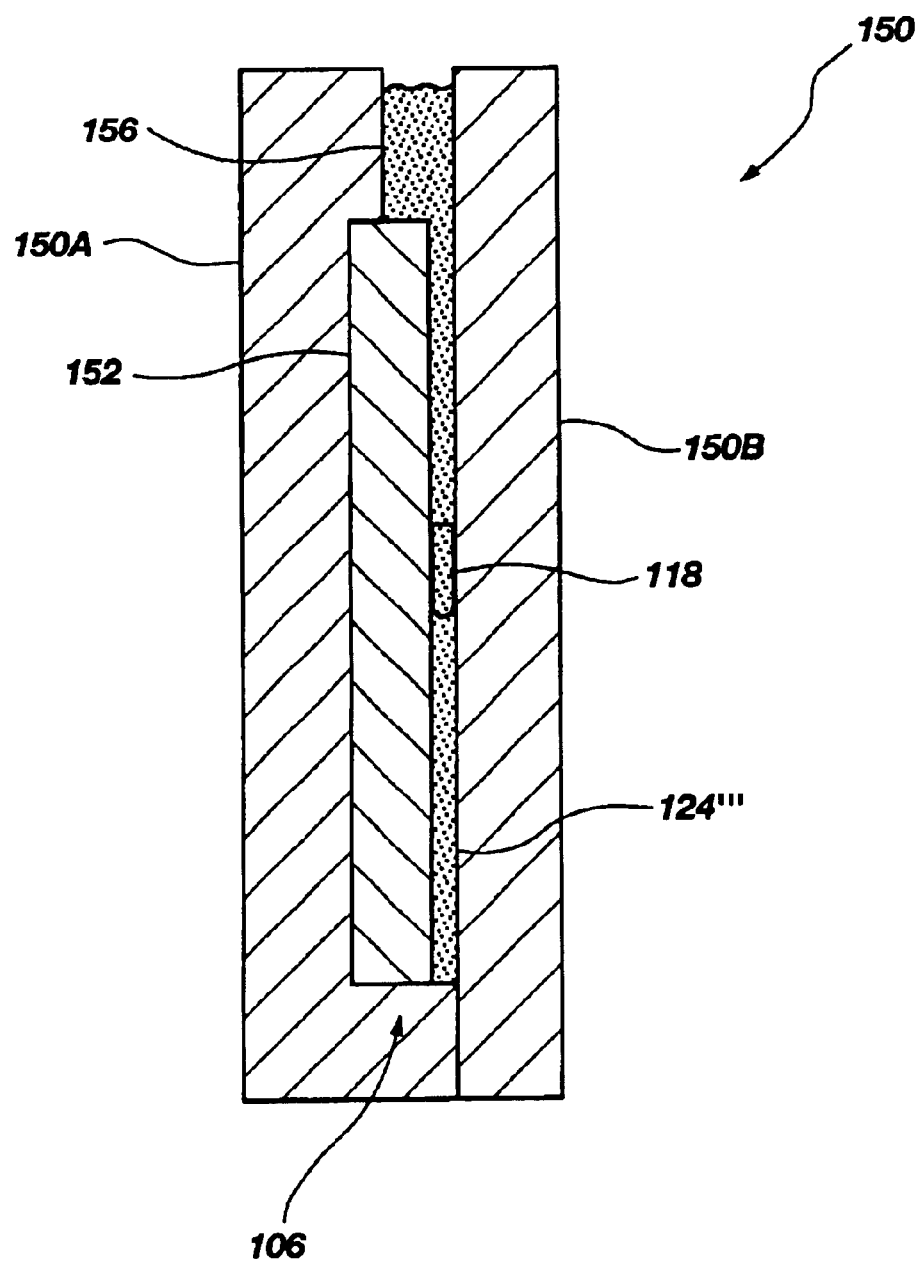

Referring to FIGS. 6A and 6B, a mold 150 is shown which includes another technique of the present invention useful in forming the ablative insulation coating 124'" on the door cover 106. Particularly, FIG. 6A depicts one-half 150A of the mold showing various features formed therein, while FIG. 6B shows a cross section of the mold 150 including the door cover 106 of FIG. 5 being formed therein.

The mold includes a first half 150A and a second half 150B with a cavity 152 formed in the first half 150A for receipt of the door cover 106. The two halves 150A and 150B may be held together by placing them in a fixture (not shown), by providing fasteners (not shown) through the two halves, or by other means known by those of skill in the art. An injection port 154 allows for introduction of ablative material into the cavity 152 from below. A relief portion 156 is also formed at the upper end of the mold 150 in the first half 150A above the cavity 152.

It is noted that the injection port 154 may be placed at a different location within the mold 150 if so desired, or, alternatively, an injection port need not be provided as the ablative material may be introduced from above through the opening above the relief portion 156.

During formation of the ablative insulation coating 124'", excess material is filled into the relief portion 156 and allowed to cure along with the ablative insulation coating 124'". During curing of the ablative insulation coating 124'", any air entrained in the uncured ablative material will rise into the relief portion 156 in the form of air bubbles. The air bubbles thus migrate away from the ablative insulation coating 124'" into the material located in the relief portion 156. The relief portion may then be trimmed off the door cover 106 in a post-cure operation. This technique is particularly useful when the material introduced into the mold 150 has been mixed by hand or by some method which introduced air into the ablative material. Of course, a similar relief portion 156 may also be incorporated when applying ablative material to other aeroskirt components. However, providing a relief in a mold is not necessary when the ablative material is mixed in a manner which degasses or removes the air from the mixture as described above herein.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method of forming an ablative coating on at least a portion of a structure comprisng:
   forming a mold having a cavity configured to cooperatively receive the at least a portion of the structure;
   placing the at least a portion of the structure in the cavity of the mold;

preforming at least one spacer from a first ablative mixture;

placing the at least one spacer between the surface of the structure and a surface of the mold within the mold cavity to establish a desired thickness of the ablative coating;

introducing a second ablative mixture that is substantially similar in composition to the first ablative mixture into the mold cavity such that is in contact with the at least a portion of the structure; and curing the second ablative mixture to bond the second ablative mixture to a surface of the at least a portion of the structure.

2. The method of claim 1, further comprising heating the second ablative mixture to reduce a viscosity thereof prior to introducing the second ablative mixture into the mold cavity.

3. The method of claim 1, wherein the curing the second ablative mixture includes curing the second ablative mixture at atmospheric pressure.

4. The method of claim 1, wherein the curing the second ablative mixture includes a first curing stage of curing the second ablative mixture at a temperature in the range of approximately 70° to 95° F.

5. The method of claim 4, wherein the first curing stage is conducted for approximately 8 hours.

6. The method of claim 5, wherein the curing the second ablative mixture further includes a second curing stage of curing the second ablative mixture at an elevated temperature subsequent to the first curing stage.

7. The method of claim 6, wherein the second curing stage further includes curing the second ablative mixture at approximately 110° F. for approximately 8 hours.

8. The method of claim 1, further comprising providing a relief in the mold for receipt of the second ablative mixture in excess of that required by the mold cavity having the at least a portion of the structure therein.

9. The method of claim 8, further comprising locating the relief above the cavity in the mold to allow air bubbles to flow into the excess second ablative mixture contained in the relief.

10. The method of claim 8, further comprising removing the mold subsequent to the curing and trimming the cured excess second ablative mixture.

11. The method of claim 1, further comprising removing the mold subsequent to the curing and buffing at least a portion of a surface of the cured second ablative mixture.

12. The method of claim 1, further comprising removing the mold subsequent to the curing and patching at least one vug in a surface of the cured second ablative mixture by placing an additional amount of ablative mixture over the at least one vug and curing the additional amount of ablative mixture.

13. The method of claim 12, further comprising shaping the additional amount of ablative mixture prior to curing thereof.

14. The method of claim 1, further comprising configuring the mold cavity such that the second ablative mixture introduced therein will form an ablative coating of varied thickness over the surface of the at least a portion of the structure.

15. The method of claim 1, further comprising configuring the mold cavity to define at least one stay-out zone such that the second ablative mixture introduced into the mold cavity forms around the at least one stay-out zone but does not impinge into the at least one stay-out zone.

16. The method of claim 15, wherein the defining at least one stay-out zone includes placing a boss about an area of the structure prior to introducing the second ablative mixture into the mold cavity and removing the boss subsequent to the curing of the second ablative mixture.

17. A method of forming an ablative coating on at least a portion of a structure, the method comprising:

forming a mold with a cavity configured to cooperatively receive the at least a portion of the structure;

placing a first coat of a release agent on a surface of the mold cavity;

baking the mold at a temperature of approximately 200° F. for approximately 6 hours;

placing a second coat of the release agent on the surface of the mold cavity subsequent the baking;

placing the at least a portion of the structure in the mold cavity after the baking the mold and after placing the second coat of release agent on the surface of the mold cavity;

mixing a salt-filled epoxy resin base, a fiber-filled polyamide hardener and a silicone resin modifier to form an ablative insulation mixture;

introducing the ablative insulation mixture into the mold cavity so that the ablative insulation mixture contacts a surface of the at least a portion of the structure; and curing the ablative insulation mixture.

18. The method of claim 17, further comprising introducing the ablative insulation mixture into the mold cavity through at least two locations in the mold.

19. The method of claim 17, wherein the curing of the ablative insulation mixture includes curing at an atmospheric pressure.

20. The method of claim 19, wherein the curing of the ablative insulation mixture includes a first curing stage of curing the ablative insulation mixture at approximately 70° to 95° F. for approximately 6 to 8 hours from a time when the ablative insulation mixture is first introduced into the mold cavity.

21. The method of claim 20, wherein the curing of the ablative insulation mixture includes a second curing stage of curing the ablative insulation mixture at an elevated temperature of approximately 110° F. for approximately 8 hours subsequent to the first curing stage.

22. The method of claim 21, further comprising removing the mold from the structure and the cured ablative insulation mixture.

23. The method of claim 17, wherein the mixing to form an ablative insulation mixture includes mixing the salt-filled epoxy resin base, the fiber-filled polyamide hardener and the silicone resin modifier with a mixing machine.

24. The method of claim 23, wherein the mixing to form an ablative insulation mixture further includes mixing the salt-filled epoxy resin base, the fiber-filled polyamide hardener and the silicone resin modifier at a pressure above atmospheric pressure.

25. The method of claim 17, wherein the mixing to form an ablative insulation mixture includes mixing the salt-filled epoxy resin base, the fiber-filled polyamide hardener and the silicone resin modifier by hand.

26. The method of claim 25, wherein the mixing to form an ablative insulation mixture includes allowing the ablative insulation mixture to sit for a predetermined time period subsequent to the mixing by hand and prior to the introducing the ablative insulation mixture into the mold cavity.

27. The method of claim 26, further comprising configuring the mold with a relief adjacent the mold cavity and flowing an excess of the ablative insulation mixture into the relief.

28. The method of claim 27, further comprising trimming the excess of the ablative insulation mixture subsequent to the curing of the ablative insulation mixture.

* * * * *

UNITED STATES PATENT AND TRADEMARK OFFICE
CERTIFICATE OF CORRECTION

PATENT NO. : 6,896,834 B2  Page 1 of 1
APPLICATION NO. : 09/950094
DATED : May 24, 2005
INVENTOR(S) : Bradford P. Packer et al.

It is certified that error appears in the above-identified patent and that said Letters Patent is hereby corrected as shown below:

| | | |
|---|---|---|
| COLUMN 1, | LINE 17, | insert a comma after "example" |
| COLUMN 3, | LINE 66, | after the "aeroskirt" (second occurrence) and before "comprises" insert --component-- |
| COLUMN 5, | LINE 18, | after "Hydra-Cat" insert a comma |
| COLUMN 6, | LINE 20, | after "of" and before "release" insert --the-- |
| COLUMN 7, | LINE 35, | after "varied" change "thickness" to --thicknesses-- |
| COLUMN 7, | LINE 38, | change "effect" to --affect-- |

Signed and Sealed this

Twenty-third Day of December, 2008

JON W. DUDAS
*Director of the United States Patent and Trademark Office*